May 17, 1960 C. D. HERCULES 2,937,267
VEHICLE HEADLIGHTS
Filed July 30, 1958 2 Sheets-Sheet 1

INVENTOR
CHRISTOPHER D. HERCULES
BY Walter S. Paul
ATTORNEY

May 17, 1960  C. D. HERCULES  2,937,267
VEHICLE HEADLIGHTS

Filed July 30, 1958  2 Sheets-Sheet 2

INVENTOR
CHRISTOPHER D. HERCULES

BY *Walter S. Paul*
ATTORNEY

# United States Patent Office 2,937,267
Patented May 17, 1960

2,937,267

VEHICLE HEADLIGHTS

Christopher D. Hercules, Washington, D.C.

Application July 30, 1958, Serial No. 752,014

1 Claim. (Cl. 240—46.53)

The present invention relates to vehicle headlights having safety characteristics against blinding of drivers passing in the opposite direction.

The main purpose and object of the present invention are to devise a headlight having means for reflecting substantially all portions of the headlamp beams directed above the horizontal, downwardly and forwardly to increase the intensity of the headlight's direct beams in the corresponding directions and eliminate substantially all of the blinding rays from reaching the drivers passing in the opposite direction.

A further object is to set the headlamps in comparatively deep hooded recesses having substantially horizontal upper reflecting surfaces extending from the top edge of the headlight beam as it leaves the headlamp, the lower surfaces of the recesses being inclined downwardly from the lower edge of the headlamp forwardly at a sufficient angle to direct any reflections of the beam at an angle forwardly below the horizontal.

Figure 1:
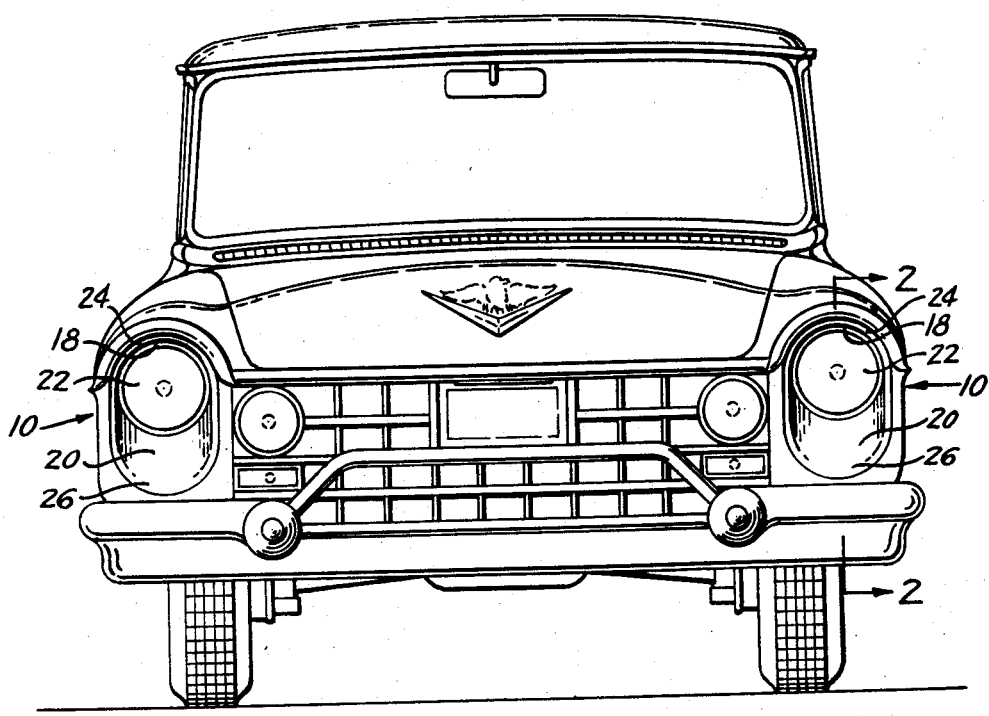
Figure 2:
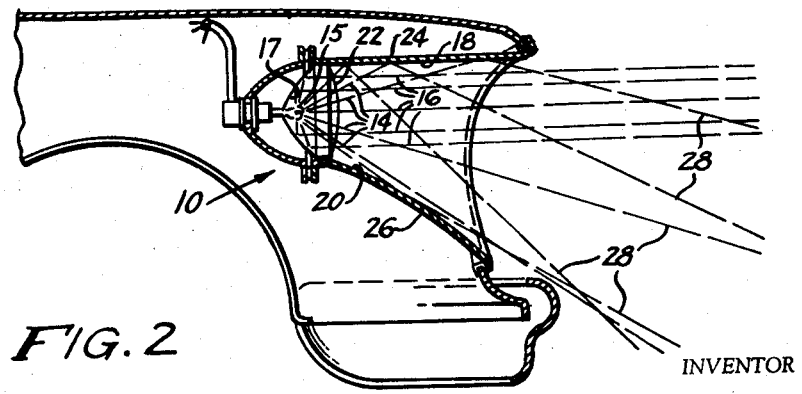
Figure 3:
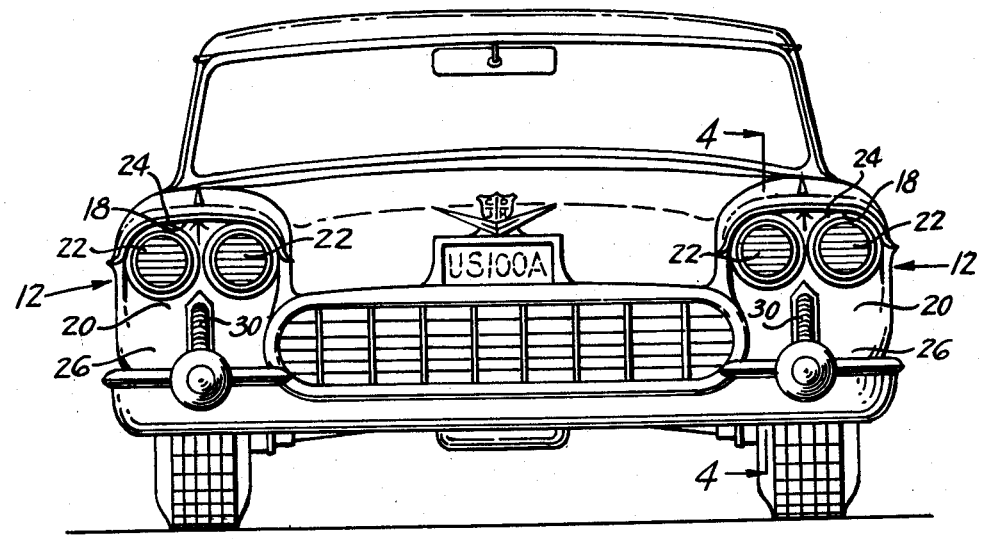
Figure 4:
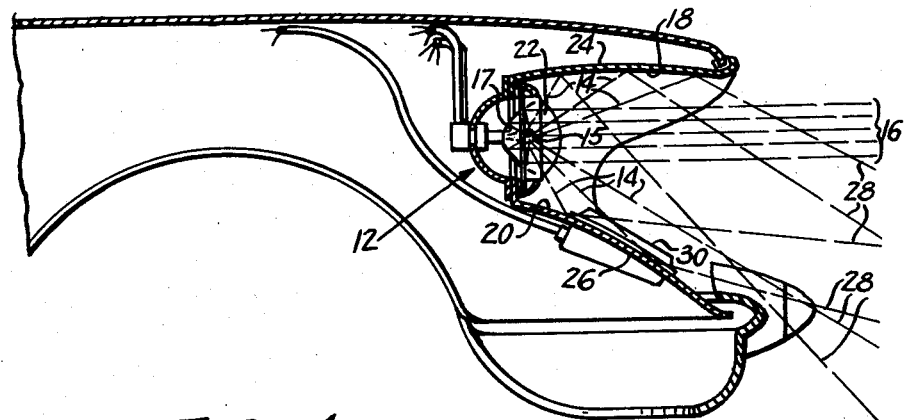

Other and more specific objects will appear in the following detailed description of the invention as illustrated in the accompanying drawings, wherein:

Fig. 1 is a front view of an automobile with a pair of headlights made in accordance with the present invention as applied to headlights having only a single headlamp in each headlight, Fig. 2 is a partial sectional view of this type of headlamp taken on the line 2—2 of Fig. 1, Fig. 3 is a front view of an automobile having headlights with a pair of headlamps in each, to which the present invention is applied, and Fig. 4 is a partial sectional view taken on the line 4—4 of Fig. 3.

The present invention is illustrated in the drawings as it might be applied to two present day arrangements of headlights used on passenger cars, one comprising the conventional pair of single main headlights, shown in Figs. 1 and 2, the other having a pair of double headlights which is becoming more popular in the newer cars, shown in Figs. 3 and 4.

The present improvement comprises a deep hooded well for each headlight, whether it is single 10 or double 12, for the purpose of shielding off substantially all of the above-horizontally directed portions of the direct and collimated beams 14 and 16 issuing from the light source 15 and the substantially parabolic reflector 17 respectively of each lamp in the headlights, in order to remove the blinding glare which normally meets oppositely approaching motorists if the headlights are not equipped with this shielding means, or are not dimmed or lowered by some conventional devices.

The advantages of the present shielding means is that no adjustment is required to eliminate the blinding glare, as is necessary in conventional headlight systems, by either tilting or dimming the beams. The present arrangement never has any blinding glare to be eliminated, and is furthermore more efficient in lighting the road area closer to the car as well as for distances ahead comparable to the conventional headlights when adjusted for bright distance lighting. The lights in the present arrangement are therefore used to their full advantage at all times without any adjustment for glare elimination. This is so, because the upper and lower walls 24 and 26, of the deep well in which the present headlight, either single or double, is mounted, have reflective surfaces 18 and 20 that extend from the top and bottom edges of the corresponding headlight face 22 substantially horizontally and at an angle downwardly, respectively, so that they will distribute substantially all of their reflected rays 28 along the road immediately ahead of the car where normally, with "bright" or raised lights, only sparse random lighting is obtained. The intense distance lighting beam in this invention is always present to light up the road for a maximum distance, while the glare portions of the beams are shielded by a sufficient extension of the upper wall 24 forward, and are reflected to light up the closer portions of the road surface.

The lower walls 26 of the wells may be suitably curved to provide a distribution of their reflected beams in any manner desired on the road ahead without directing any substantial reflections in a direction forwardly above the horizontal.

The upper walls 24 may also be curved, as shown in Fig. 4, or in any other manner to provide any desired distribution of the reflected rays along the road immediately ahead.

The parking or signal lights 30 may be incorporated in the bottom wall 26 if desired, as shown in Figs. 3 and 4.

Some other advantages of the present invention are that fog glare is substantially eliminated as an additional aid to a motorist whose vehicle possesses these lighting characteristics.

This type of hooded headlights can also readily be adapted to the present day type of high level fender construction without interfering with the front wheel arrangement.

Many modifications in the shape and construction of the parts and their mounting may obviously be made without departing from the spirit and scope of this invention, as defined in the appended claim.

What is claimed is:

A headlight for vehicles comprising a source of light, a substantially parabolic reflector for reflecting a concentrated beam of rays from said source substantially horizontally forwardly, a substantially horizontal reflector shield extending forwardly sufficiently from the upper half of said parabolic reflector to substantially cut off the portion of said beam which spreads above the horizontal, and to reflect said portion downwardly in a forwardly spreading beam, and a downwardly inclined reflector extending forwardly from the lower half of said parabolic reflector and having a gently curved surface of sufficient downward inclination to reflect substantially all the rays striking it from the light source and parabolic reflector, in directions substantially below the horizontal, said downwardly inclined reflector being below the rearmost rays of said forwardly spreading beam reflected from said reflector shield.

References Cited in the file of this patent

UNITED STATES PATENTS

| | | |
|---|---|---|
| 1,328,692 | Richard | Jan. 20, 1920 |
| 1,702,960 | Betzer | Feb. 19, 1929 |
| 2,784,303 | Heiser | Mar. 5, 1957 |